United States Patent

[11] 3,595,100

[72] Inventors Friedrich Stark
Langenselbold;
Wilhelm Steinmetz, Dorfles near Coburg;
Heinz Pohlein, Steinrodortsteil Blumenrod,
all of, Germany
[21] Appl. No. 840,743
[22] Filed July 10, 1969
[45] Patented July 27, 1971
[73] Assignee Werkzeugmaschinenfabrik Adolf Waldrich Coburg
Coburg, Germany
[32] Priority July 12, 1969
[33] Germany
[31] P 17 75 174.5

[54] HYDROSTATIC LUBRICATING DEVICE FOR THE ZONES BETWEEN THE INTERENGAGING ELEMENTS OF A WORM AND AN INTERNALLY THREADED MEMBER
8 Claims, 3 Drawing Figs.
[52] U.S. Cl. .................................................. 74/409,
74/424.8 R, 184/6 U
[51] Int. Cl. .................................................. F16h 1/20
[50] Field of Search .......................................... 184/6, 6 U;
308/5; 74/467, 468, 424.8, 409

[56] References Cited
UNITED STATES PATENTS
3,323,385   6/1967   Revitt ...........................   74/468 X
3,415,138  12/1968   Rumbarger et al. ..........   74/468 X
3,424,022   1/1969   Greenberg ....................   74/409
3,448,631   6/1969   Sullivan .......................   74/409
3,448,632   6/1969   Rumbarger ..................   74/468 X
3,454,136   7/1969   Stark ............................   184/6

Primary Examiner—Manuel A. Antonakas
Attorney—Woodhams, Blanchard and Flynn

ABSTRACT: A hydrostatic lubricating device for lubricating the interengaging portions of the teeth of a worm and an internally threaded member by utilizing distributor means for directing lubricant to only those portions of the teeth that are in engagement. This distributor means comprise bars having openings which open to and communicate with other openings in the internally threaded member to supply lubricant to the interengaging teeth. The bars are maintained in engagement with a side surface of the internally threaded members by the pressure on the lubricant and additionally, if desired, by springs.

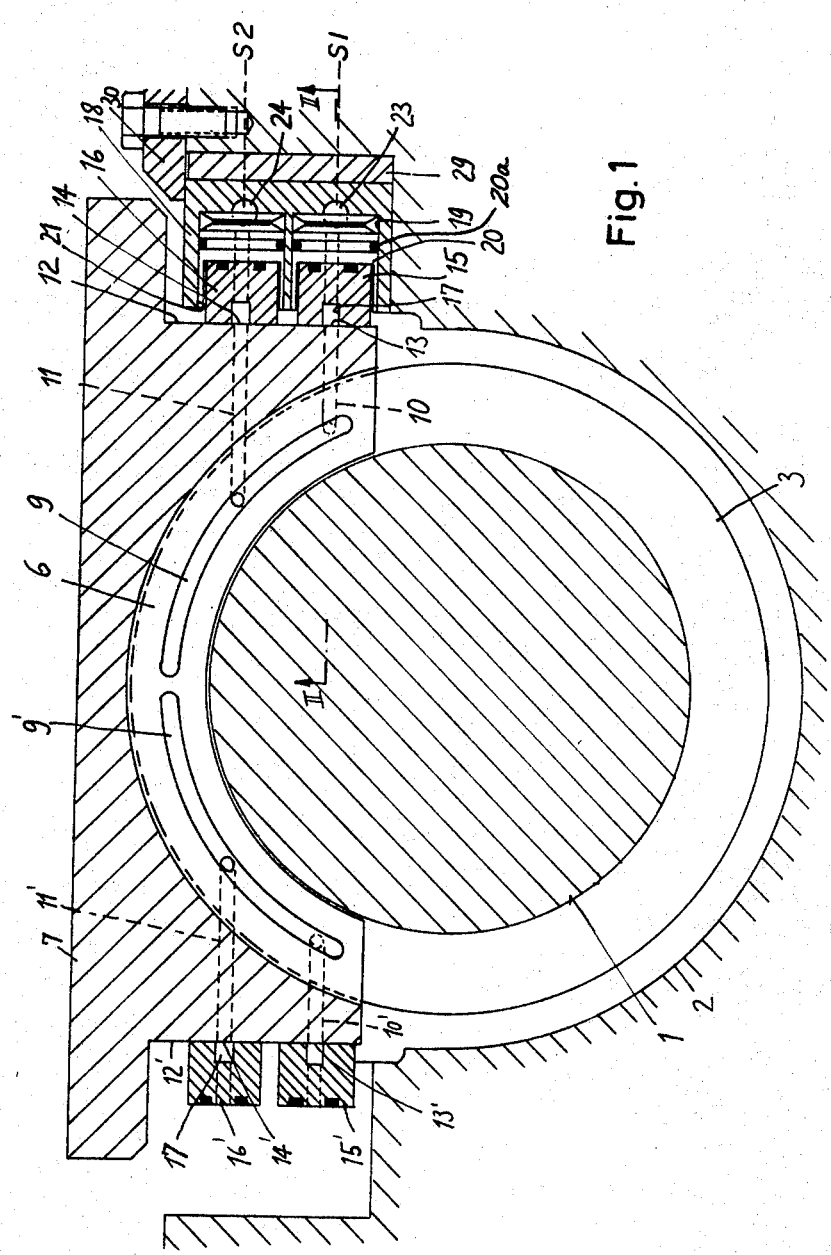

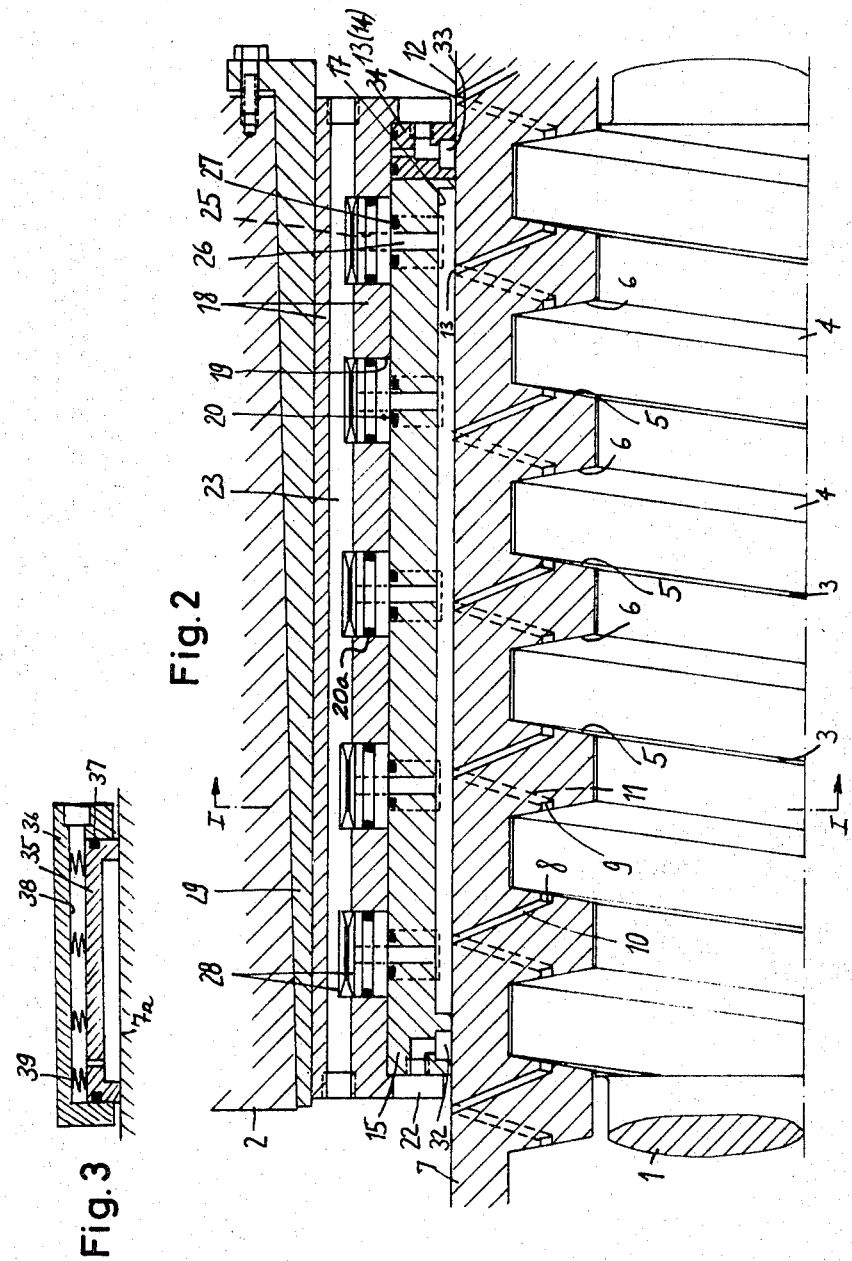

HYDROSTATIC LUBRICATING DEVICE FOR THE ZONES BETWEEN THE INTERENGAGING ELEMENTS OF A WORM AND AN INTERNALLY THREADED MEMBER

The invention relates to a hydrostatic lubricating device for the zones between the interengaging elements of a worm and an internally threaded member, the tooth flanks being provided with specific lubricating-oil grooves arranged in groups, of which each group is supplied separately with lubricating oil and directed respectively toward oppositely directed tooth flanks. Such a hydrostatic lubricating device is preferably used for driving the table of large planing or grinding machines.

A hydrostatic lubricating device in which the feeding of lubricating oil takes place through separate channels which are arranged in the worm is already known. Due to the fact that lubricating oil is under pressure and fed separately to the oppositely directed tooth flanks, these flanks are held at a distance from the cooperating flanks of the worm and, thus, wear is substantially minimized. The term "oppositely directed flanks" refers to the flanks which are positioned in a certain operating direction in direction of the pressure or to all flanks positioned opposite to these flanks. It has now been found that in the known hydrostatic lubricating device at high rotational speeds of the worm, difficulties occur in the creation of noise, heat generation and quietness of running so that very fine surface imperfections on very precisely worked plane surfaces can result therefrom.

Hydrostatic lubricating devices are also known in which a spindle nut cooperates with a longer spindle and the feeding of lubricating oil takes place through lubricating-oil passageways in the spindle nut. The known measures used in these spindle nuts, however, cannot be used for an internally threaded member.

Therefore, the basic purpose of the present invention is to produce a hydrostatic lubricating device for the zones between interengaging elements of the worm and an internally threaded member of the type of structure mentioned above, which also permits higher operating speeds. To attain this purpose, the present invention is based on the thought of providing the internally threaded member itself with lubricating-oil passageways and to discharge these lubricating-oil passageways against the internally threaded member in the zone of the worm through distributor bars located in the zone through the use of the pressure of the lubricating oil itself with the additional assistance of a spring force, which the internally threaded member moves slidingly with respect to the distributor bars during operation. The invention is characterized in detail through the following characteristics:

a. the internally threaded member is provided with lubricating-oil passageways which connect at least one side surface of the internally threaded member to the lubricating-oil grooves, b. the lubricating-oil passageway ports are arranged on the side surface in at least two parallel rows which rows extend in longitudinal direction of the internally threaded member, each row being associated with oppositely directed tooth flanks, c. distributor bars are provided in the zone of the worm, which distributor bars extend in longitudinal direction of the internally threaded member to cover the ports of the lubricating-oil passageways and each have a distributor channel which is open to the side surface of the internally threaded member and extends over several ports, d. The distributor bars are movably guided perpendicularly to the side surface of the internally threaded member in a stationary housing, e. the distributor bars are pressed against the internally threaded member by means of springs arranged between said distributor bars and the housing and also the pressure of the lubricating oil in special pressure chambers provided between and housing and the distributor bars, and f. the distributor bars for the oppositely directed tooth flanks are connected to separate lubricating oil supply means.

Through this, lubricating oil is fed at the respectively required pressures to the oppositely directed tooth flanks of the worm. Since the feeding of lubricating oil to the loaded tooth flanks takes place independently from the feeding of lubricating oil to the unloaded tooth flanks, a lubricating-oil cushion is formed between each of the flanks of the worm and the internally threaded member which face each other, which lubricating-oil cushion prevents a direct contact of these flanks. In this manner, a worm gearing is produced which has little wear, works efficiently and has not play. The lack of play which is obtained by the high rigidity of the lubricating-oil film between the flanks, is particularly advantageous during milling under synchronous conditions. The engaging teeth of the worm and the internally threaded member are lubricated reliably which is advantageous for maintaining the dimensions of these parts and for ease in selecting the material. For example, a surface treatment through hardening is not necessary. The face that the lubricating bars are pressed against the internally threaded member only with the truly required pressure must be particularly emphasized. This is achieved in such a manner that according to the characteristic (e) of the present invention, pressure chambers are provided between the distributor bars and the housing which are also supplied with pressurized lubricating oil whereby this lubricating oil is under the same pressure as the lubricating oil which is supposed to reach the tooth flanks. If this pressure is increased in order to adjust to a greater work output, then the pressure is also automatically increased with which the distributor bars are pressed against the side surfaces; the lubricating film thickness between the side surface of the internally threaded member and the distributor bars is being reduced according to the known fluid flow laws of hydrostatic bearings. In the reversed manner, the distributor bars are pressed against the side surface lighter at a low pressure and the lubricating film thickness increases at the side surface of internally threaded member and distributor bars.

If the geometric dimensions for the fluid flow length and the fluid flow width at the distributor side surface are chosen correctly, the amount of oil flowing at the side surface, which amount of oil is the amount of loss, is approximately 0.25 percent of the total amount. This is an extremely small portion which assures hydrostatic lubrication and, thus, Newton's friction relations are met at all operating conditions on the side surface between internally threaded member and distributor. Thus, friction is minimized and the occurrence of wear is not possible. The use of springs for an additional contact pressure is advantageous so that even in the case of a small contact pressure force, a reliable contact pressure occurs and, furthermore, during all operation pressures, the force pressing the distributor bar against the side surface out balances the force tending to push the distributor bar away from the side surface.

It has been found that the lubricating film formation between the tooth flanks is not completely even if the lubricating-oil passageways are not filled completely before entering underneath the distributor bars. It has been discovered that if special fill holes are provided at the ends of the distributor bar, which fill holes are fed through a separate lubricating-oil source at a lower pressure a precise operation will result which is also very quiet. These fill holes are used to completely fill the lubricating-oil passageways provided in the internally threaded member before they reach the zone of the distributor bars. Thus, they do not need to be filled when they get to their position underneath the distributor bar which could lead to discontinuities in the feed of the lubricating oil. A sufficient filling causes a rhythmical lubricating film thickness change and thus a small relative movement of the internally threaded member with respect to the worm in comparison to the uniform helical movement of the latter. The fill holes which are separately supplied also avoid the aforesaid small relative movement. Further details and advantages of the invention will be described more in detail hereinafter in connection with the exemplary embodiments illustrated in the drawings, in which:

FIG. 1 is a cross-sectional view of one embodiment of the invention along the line I–I of FIG. 2;

FIG. 2 is a longitudinal cross-sectional view of said embodiment along the line II-II of FIG. 1;

FIG. 3 is the schematical illustration of a further embodiment of the invention. In the drawings, a worm is identified at 1 which is rotatably supported in the worm housing 2. The worm 1 has tooth flanks 3 and oppositely directed tooth flanks 4. The worm 1 cooperates with corresponding tooth flanks 5 and 6 of a longitudinally movable internally threaded member 7. Specific lubricating-oil grooves 8, 9, 9' are provided in the tooth flanks 5 and 6 of the internally threaded member. The lubricating-oil grooves 8, 9, 9' are connected to the side surfaces 12, 12' (FIG. 1) of the internally threaded member 7 through lubricating-oil passageways 10, 11 or 10', 11'. The ports of the lubricating-oil passageways 10, 11, 10', 11' are identified at 13, 14 or 13', 14'.

The ports of the lubricating-oil passageways 13, 14 or 13', 14' at the side surfaces 12, 12' are each arranged in two rows extending parallel in longitudinal direction of the internally threaded member 12, each row being associated with one of the oppositely directed flanks 5 or 6.

Distributor bars 15, 16 or 15', 16' are provided in the zone of the worm 1, said distributor bars extending in longitudinal direction of the internally threaded member 7 and covering the ports 13, 14 or 13', 14' of the lubricating-oil passageways. The distributor bars 15, 16 or 15', 16' each has a distributor channel 17 which is open to the side surface 12 or 12' of the internally threaded member and extends over several ports. Since the distributor bars are each of the same structure, only one distributor bar will be referred to hereinafter for convenience purposes only. It is to be understood that this discussion is to apply to the remaining undiscussed distributor bars.

The distributor bars 15, 16 are movably guided in a stationary housing 18 perpendicularly to the side surface 12 of the internally threaded member. Several cylinder passageways 19 are provided in the distributor bars 15, 16 and are arranged in a row and extend perpendicularly thereof. Correspondingly sealed pistons 20 are movably guided in said cylinder passageways 19. These pistons 20 are supported on the distributor bar 15 or 16. In order to provide the piston with a good guide and to produce a space-saving type of construction, each piston 20 is provided with a recess 21 (FIG. 1) at their ends facing the distributor bar 15 or 16, which distributor bar 15 or 16 is partially received in said recess 21. The housing 18 is provided with a corresponding recess 22 (FIG. 2). The cylinder passageways 19 are supplied with lubricating oil in the housing 18 through a common feed channel 23. Similar feed channels 24 are provided for the cylinder passageways 19 which are associated with the distributor bar 16. The feed channels 23, 24 are connected to separate lubricating-oil supply means S1 and S2 shown in FIG. 1. The pistons 20 are provided advantageously with an axial passageway 25 which is in alignment with a transverse passageway 26 extending through the distributor bar 15 to connect same to the channel 17. The distributor bar is sealed with respect to each piston 20 by means of an O-ring 27. Lubricating oil, which is under pressure, can reach the distributor channel 17 through the axial passageway 25 and the transverse passageway 26. Due to the pressurized lubricating oil which simultaneously acts onto the pistons 20, the distributor bar 15 and also correspondingly the remaining distributor bars are pressed against the side surface 12 of the internally threaded member 7, under a pressure which is dependent from the pressure at which the lubricating oil is fed to the tooth flanks and which corresponds to the load pressure in the tooth flanks.

The pistons 20 are also provided with O-rings 20a for sealing with respect to the housing 18.

To additionally press the distributor bars 15 and 16 against the internally threaded member 7, cup springs 28 (FIG. 2) are provided which are arranged in the cylinder passageways 23 and which are supported on one side on the bottom of the cylinder passageway and on the other side on the piston 20. The cup springs have the purpose of pressing the distributor bar against the side surface 12 of the internally threaded member 7 even if no oil pressure exists, such as during the time that the device is not in operation or is in the starting phase.

Since cup springs, as this is known, have only a very short spring deflection, it is desirable to provide an adjustable spline part 29 between the housing 18 and the stationary part 2 of the machine for the basic adjustment of the entire lubricating device. By moving the spline part in a longitudinal direction of the housing 18, the housing can be adjusted toward and away from the internally threaded member. When the desired adjusted position is reached, the housing 18 is fixed by the connecting strip 30 illustrated in FIG. 1.

The above-described lubricating device operates as follows:

Pressurized lubricating oil is fed from a separate lubricating-oil supply means (not shown) to the feed channels 23, 24 through connecting lines (also not illustrated). Rotary pumps which supply independently of the load pressure, an almost constant oil pressure are used in the lubricating-oil supply system. The lubricating oil acts on the pistons 20 and presses the distributor bars 15, 16 against the side surface 12 of the internally threaded member. A sealing is achieved in the starting phase at an output pressure of 0 atu. by the pressure of the cup springs 28. However, the cup spring pressure decreases with an increase in the oil pressure but the oil pressure provides a further contact pressure between the distributor bars and the side surface 12. Thus, a satisfactory sealing between the distributor bars and the side surface 12 of the internally threaded member is assured at all times. It is thereby of no importance, and it is even desired, if a small portion of the lubricating oil is discharged between the distributor bars and the side surface of the internally threaded member to provide a satisfactory lubrication between these parts. Even though the contact pressure of the distributor bar on the side surface of the internally threaded member increases with an increase in oil pressure, the amount of lubricating oil discharged between the distributor bars and the side surface is small over the entire pressure zone. The lubricating oil further reaches the distributor channels 17 in the distributor bars 15 and 16 through the axial passageways 25 and the transverse passageways 26. Due to the arrangement of the ports 13 in a single row, which ports are each associated with the lubricating-oil grooves 8 of the flanks 5 of the internally threaded member 7, which flanks 5 are positioned on the right in FIG. 2, lubricating oil is fed through the flanks 6, which are differently directed and which are positioned on the left, through the distributor bat 16, the ports 14, the lubricating-oil passageways 11 and the lubricating-oil grooves 6.

It is advantageous for maintaining the lubricating-oil film between the tooth flanks constant by completely filling the lubricating-oil passageways 10, 11 with lubricating oil before they reach the zone of the distributor channel 17, however, without placing the lubricating oil under a substantial pressure. Fill holes 32 or 33 are, therefore, provided at the ends of each distributor bar 15 or 16 for filling purposes, said fill holes being fed by a separate lubricating-oil source which is under a small pressure. The fill holes 32 or 33 are open toward the side surfaces 12 of the internally threaded member 7 and are positioned in the zone of the ports 13 or 14 of the lubricating-oil passageway. Figure 2 illustrates two exemplary embodiments whereby on the left side in FIG. 2, the lubricating-oil hole 32 is provided directly in the distributor bar 15. Only the ports 13 can be filled through said hole 32 upon a relative movement between the internally threaded member 7 and the base 2, while for filling the ports 14 a corresponding fill hole is provided in the second distributor bar 16.

In the exemplary embodiment illustrated on the right side in FIG. 2, a transverse bar 34 is provided transversely to the distributor bars 15 and 16, said transverse bar 34 being provided with a transverse channel 33. The transverse channel 33 is positioned both in the zone of the ports 13 and also in the zone of the ports 14 so that same are filled simultaneously upon a relative movement between the internally threaded member 7 and the base 2.

The present invention is not to be limited to the material above described. It would, for example, also be possible to also press the distributor bars against the sidewall, as this is the case in the exemplary embodiment illustrated in FIGS. 1 and 2, by means of pistons which are under the pressure of the lubricating oil but not feeding the lubricating oil through axial passageways in the pistons and transverse passageways in the distributor bars but, for example, through a direct lubricating-oil feed to the distributor bar.

FIG. 3 schematically illustrates a further exemplary embodiment of the invention in which the distributor bar 35 is movably guided in the housing 36 perpendicularly to the internally threaded member 7a and is sealed by a sealing member 37. In this manner a pressure chamber 38 is formed between the housing 36 and the distributor bar 35, said pressure chamber assuring a contact pressure of the distributor bar dependent on he supplied lubricating oil pressure. An additional contact pressure can be obtained through the utilization of springs 39.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A hydrostatic lubricating device for the zones between the interengaging elements of a worm and an internally threaded member, the toothed flanks of the internally threaded member being provided with specific lubricating-oil grooves, comprising:

lubricating-oil passageways in said internally threaded member opening outwardly at least one side surface to define lubricating-oil passageway ports, and are connected in fluid communication to said lubicating-oil grooves, said lubricating-oil passageway ports being arranged on said side surface in at least two parallel rows which extend in a longitudinal direction relative to the internally threaded member, each row being associated with one of said oppositely directed toothed flanks;

distributor bars extending in a longitudinal direction relative to the internally threaded member and covering said lubricating-oil passageway ports, each of said distributor bars having a distributor channel which opens toward said side surface of said internally threaded member and said lubricating-oil passageway ports;

housing means movably guiding said distributor bars generally perpendicularly to said side surface of said internally threaded member;

separate pressurized lubricating-oil supply means;

cylinder passageway means in said housing means extending generally perpendicularly to said distributor bars and connected in fluid communication with said separate pressurized lubricating-oil supply means, piston means in said cylinder passageway means connected to said distributor bars, said pressurized lubricating oil urging said piston means and said distributor bars toward and against said internally threaded member, said separate lubricating-oil supply means being connected in fluid communication with each of said distributor bars for supplying pressurized lubricating oil to said oppositely directed toothed flanks; and spring means arranged between said distributor bars and said housing means for continuously urging said distributor bars toward and against said internally threaded member with a minimum force necessary, in the absence of a supply of pressurized lubricating oil from said lubricating-oil supply means to maintain the distributor bars in engagement with said internally threaded member.

2. Device according to claim 1, wherein the piston means each have an axial passageway which is in alignment with a transverse passageway which extends to the distributor channel in the distributor bar.

3. Device according to claim 1, wherein the spring means are advantageously arranged in the cylinder passageway means in the form of cup springs and are supported on one side on the bottom of the cylinder passageway means and on the other side on the piston means.

4. Device according to claim 1, wherein each piston has at its end facing the distributor bar a recess into which the distributor bar is partially received, whereby the housing means is provided with a corresponding recess.

5. Device according to claim 1, wherein the housing means is supported on a stationary part of the machine through an adjustable spline part.

6. Device according to claim 1, wherein a common housing for two distributor bars which are associated with the oppositely directed tooth flanks.

7. Device according to claim 1, wherein the fill holes, which are fed by said separate lubricating-oil supply means at less pressure, are provided at the ends of each distributor bar, said fill holes being open to the side surface of the internally threaded member and being positioned in the zone of the ports of the lubricating-oil passageways.

8. Device according to claim 7, wherein a transverse bar with a transverse channel is provided at the end of the distributor bars for coupling to two parallel rows of said ports.